W. C. WINFIELD & A. C. TAYLOR.
ELECTRIC WELDING MACHINE.
APPLICATION FILED OCT. 16, 1911. RENEWED JUNE 11, 1913.
1,068,473.
Patented July 29, 1913.
4 SHEETS—SHEET 1.
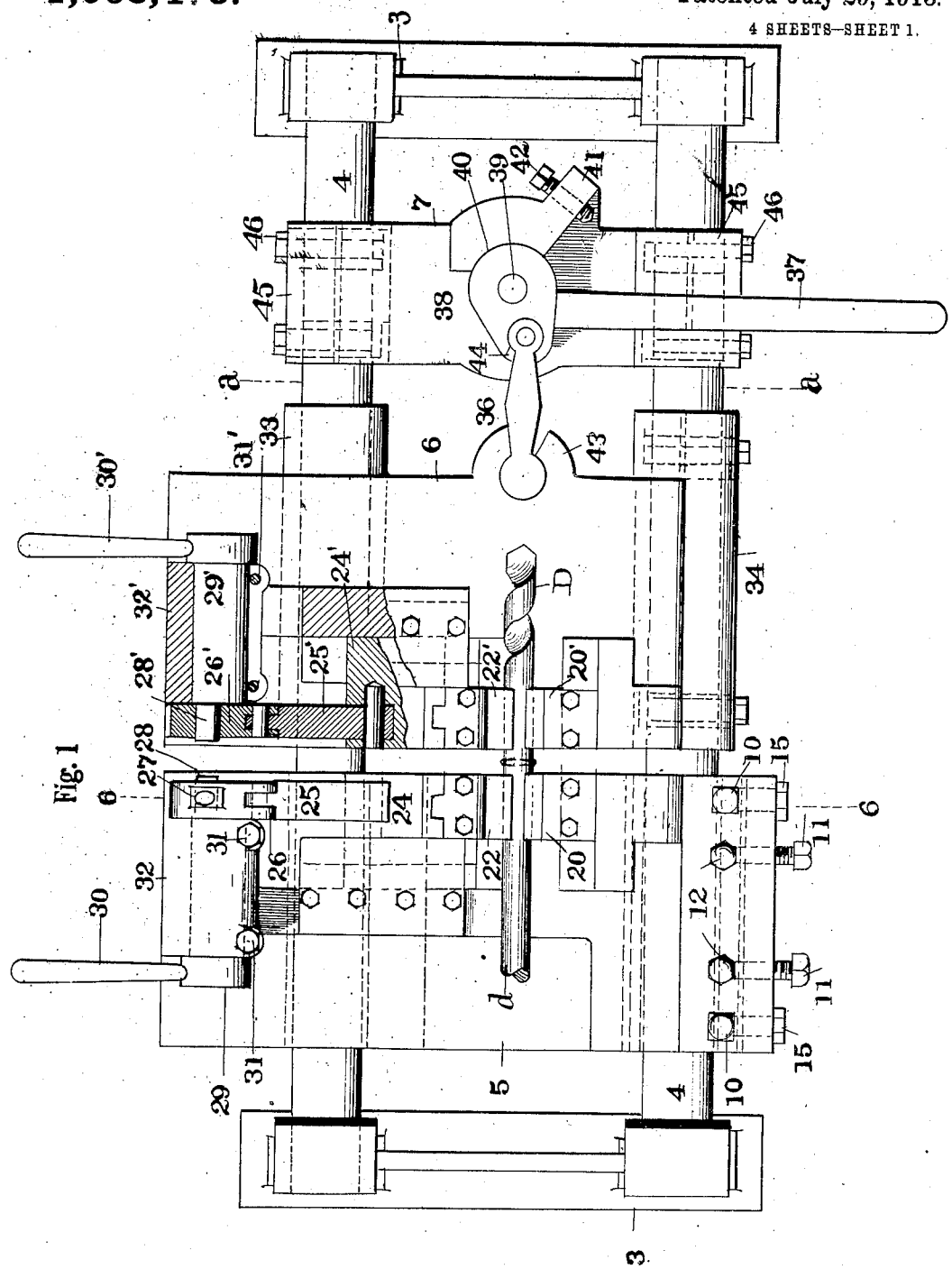
ATTEST
INVENTORS
WILLIAM C. WINFIELD
ALBERTIS C. TAYLOR
By Fisher & Mosett ATTYS.

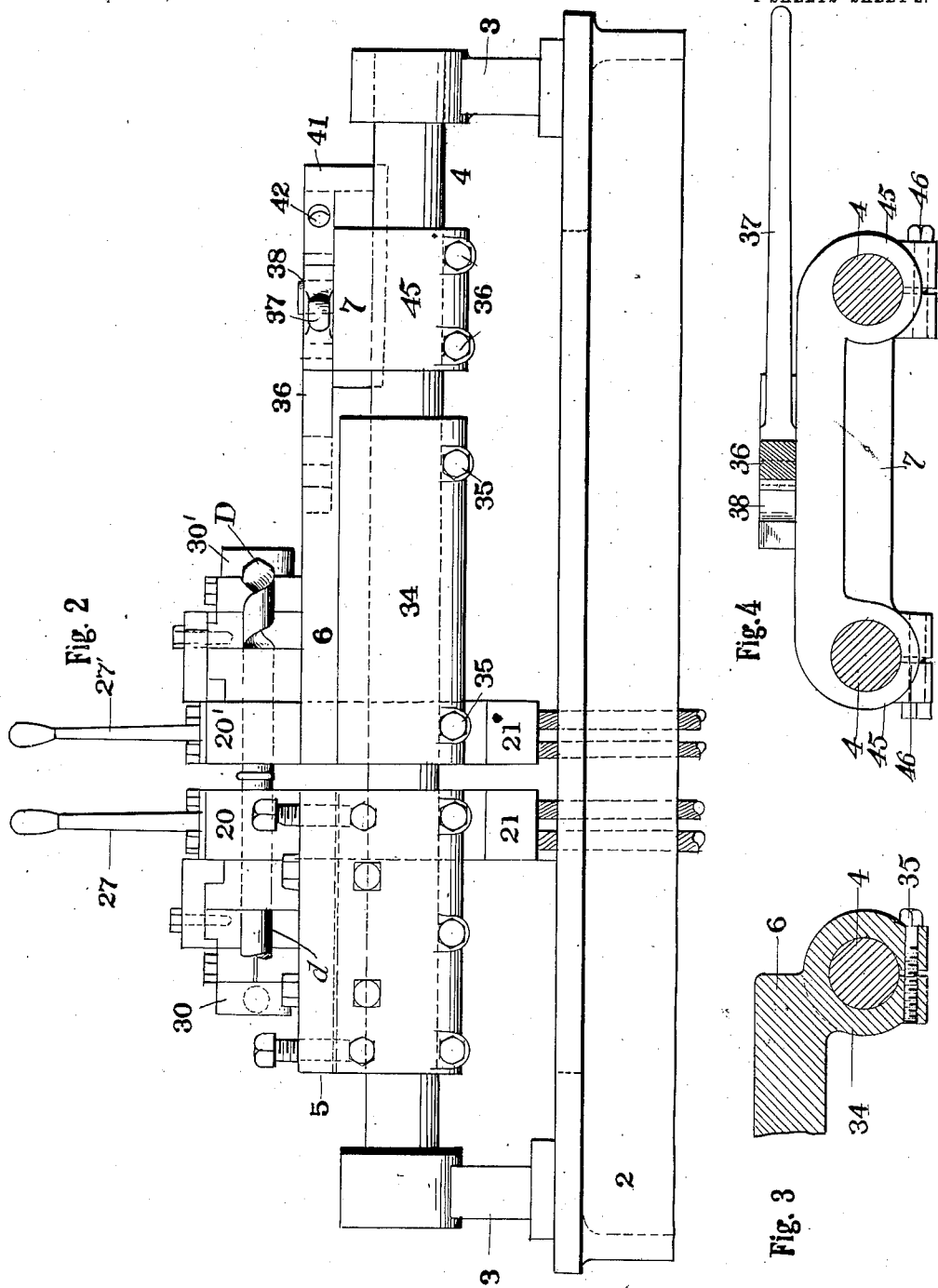

W. C. WINFIELD & A. C. TAYLOR.
ELECTRIC WELDING MACHINE.
APPLICATION FILED OCT. 16, 1911. RENEWED JUNE 11, 1913.

1,068,473.

Patented July 29, 1913.
4 SHEETS—SHEET 3.

ATTEST
E. M. Fisher
F. C. Musson

INVENTORS
WILLIAM C. WINFIELD
ALBERTIS C. TAYLOR
BY Fisher & Moser ATTYS.

W. C. WINFIELD & A. C. TAYLOR.
ELECTRIC WELDING MACHINE.
APPLICATION FILED OCT. 16, 1911. RENEWED JUNE 11, 1913.

1,068,473.

Patented July 29, 1913.
4 SHEETS—SHEET 4.

ATTEST
E. M. Fisher
F. C. Musson

INVENTORS
WILLIAM C. WINFIELD
ALBERTIS C. TAYLOR
By Fisher & Moser ATTYS.

UNITED STATES PATENT OFFICE.

WILLIAM C. WINFIELD AND ALBERTIS C. TAYLOR, OF WARREN, OHIO; SAID TAYLOR ASSIGNOR TO THE NATIONAL ELECTRIC WELDER COMPANY, OF WARREN, OHIO, A CORPORATION OF OHIO, AND SAID WINFIELD ASSIGNOR TO THE WINFIELD MANUFACTURING COMPANY, OF WARREN, OHIO, A CORPORATION.

ELECTRIC WELDING-MACHINE.

1,068,473.     Specification of Letters Patent.     Patented July 29, 1913.

Application filed October 16, 1911, Serial No. 654,974. Renewed June 11, 1913. Serial No. 773,143.

*To all whom it may concern:*

Be it known that we, WILLIAM C. WINFIELD and ALBERTIS C. TAYLOR, citizens of the United States, residing at Warren, in the county of Trumbull and State of Ohio, have invented certain new and useful Improvements in Electric Welding-Machines, of which the following is a specification.

This invention relates to improvements in electric welding machines, and comprises a machine especially adapted to make a butt-weld between two articles requiring perfect alinement, substantially as herein shown and described and more particularly pointed out in the claims.

One of the objects of the invention is to provide alined shafts or their equivalent and adjustable supporting members for separate sets of work-holding clamps and a pressure-applying device, whereby said clamps and device may be independently and accurately adjusted and set to produce perfect welding results in different kinds of work.

A further object is to provide a toggle and lever device having a thrust block, and which device is arranged to give a straight powerful thrust on a direct line with the work.

A still further object is to provide means to adjustably fix one of the clamp supporting members in different vertical, transverse and longitudinal positions, particularly in respect to the adjacent clamp.

Another object is embodied in the work-holding clamps which are particularly constructed to open and close on different angularly-related lines of movement so that the work may be introduced, removed and handled with despatch and convenience.

Other objects are also embodied in other details of construction as will hereinafter appear.

Figure 5:
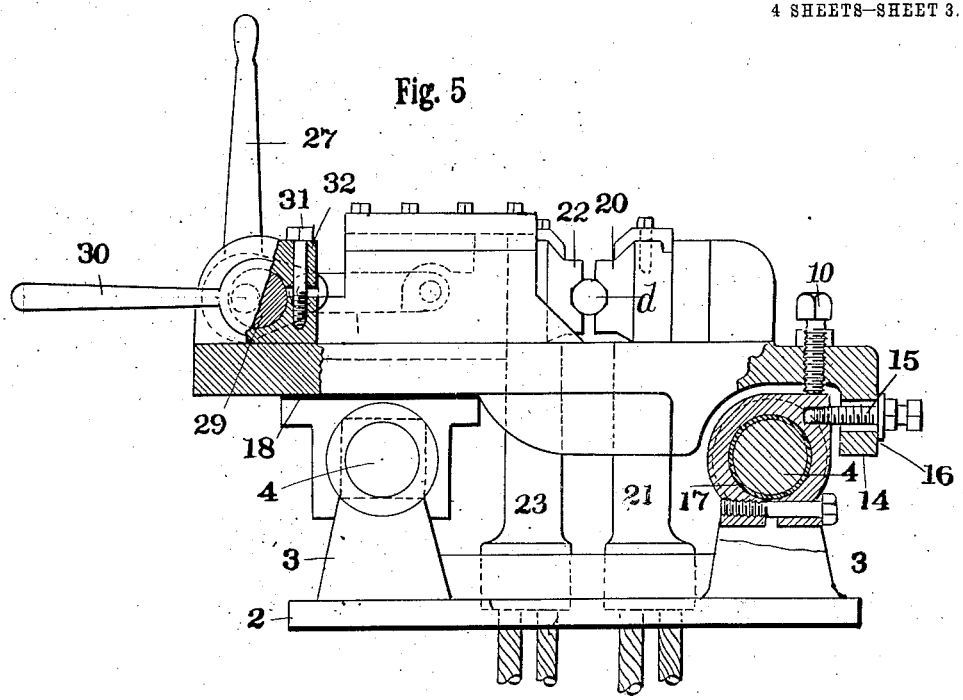
Figure 6:
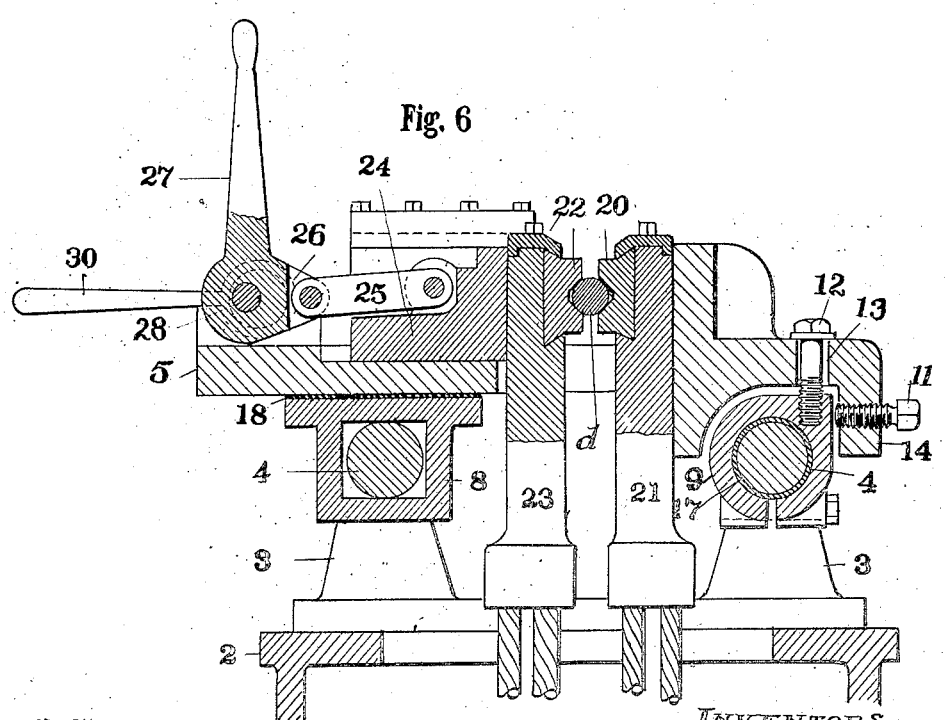
Figure 7:
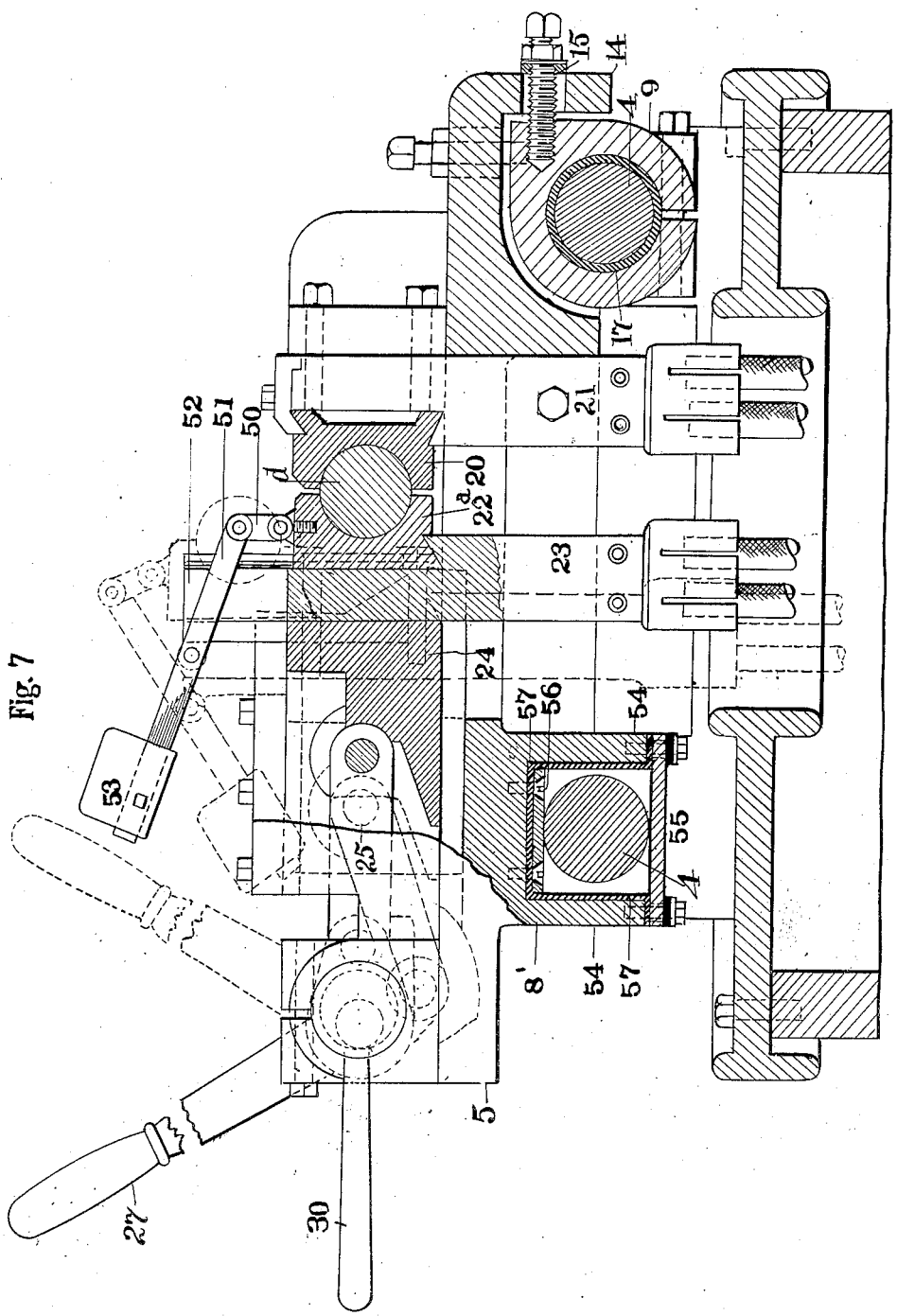

In the accompanying drawings, Figure 1 is a plan view of the invention, and Fig. 2 is a front elevation thereof. Fig. 3 is a sectional detail of the split clamping portion of the slide member. Fig. 4 is a cross section on line *a—a*, Fig. 1. Fig. 5 is an end view of Fig. 1, with portions shown in section. Fig. 6 is a cross section of the machine, on line 6—6, Fig. 1. Fig. 7 is a sectional view of a different form of the invention showing improved features of preferred construction particularly applicable to this type of machine.

The machine comprises a frame 2 upon which a pair of uprights 3 are secured to support two rods or shafts 4 in parallel alinement above and apart from said frame and spaced apart from each other. Shafts 4 may be of any shape in cross section, but are preferably made round to guide, aline and support table 5, slide 6 and cross-bar 7. Table 5 may be shifted to any desired position longitudinally on shafts 4 as well as transversely and to different inclined horizontal planes, the means to gain these several ends comprising a slotted box 8 affixed to the bottom of the table to inclose one of the shafts 4, and a split clamping sleeve 9 on the other shaft having separate sets of bolts 10 and 11 screwed into and engaged with said sleeve and table. Bolts 10 are threaded through the top of the table and bear down upon the upper flat face of sleeve 9 to raise or lower the table to different inclined planes—inclined for the reason that the opposite side of the table is confined by box 8 to rest and turn on shaft 4. Locking of the table against upward movement is obtained by bolts 12 which pass through openings 13 in the table and screw into sleeve 9, see Fig. 6. On the other hand, bolts 11 screw through depending flange 14 of the table and bear against the vertical flat face of sleeve 9 to set the table transversely of the machine within the limit of movement fixed by box 8, and bolts 15 (see Fig. 5) extend through openings 16 in flange 14 and screw into sleeve 9 to adjustably limit outward movement of the table in respect to said sleeve. The slots or openings 13 and 16 provide allowance for shift in the table, both vertically and transversely, and also on horizontal lines, the latter adjustment being of advantage in setting the table on slightly different angles in a horizontal plane to bring the parts to be welded into any predetermined alinement. A lining 17 of fiber or other non-conducting material is interposed between sleeve 9 and shaft 4, and similar insulation 18 is provided between box 8 and table 5, thereby electrically insulating the table and all parts thereon from the shafts and main frame and the balance of the machine.

The work-holding clamps on table 5 consist of one fixed jaw 20 having a terminal leg 21 and one movable jaw 22 having a terminal leg 23. Jaw 22 is affixed to a slidable head 24 working in guideways on the table, and a link 25 connects said head with the short arm 26 of a bell-crank lever 27 mounted to turn on an eccentric pin 28 of a rotatable stem 29 having a handle 30.

The limit of movement of head 24 may be adjustably fixed by rotation of stem 29, a set position being obtained by bolts 31 and split bearing 32. The object of this construction is to provide effective clamping of different kinds and sizes of work between the jaws under sensitive and responsive control of the operator, and to promote uniform conductivity of current and avoid uneven heating of the parts to be welded.

Now referring to slide 6, it is seen that this part carries work-holding clamps which correspond in every respect to the parts just described on table 5, and therefore, a repetition of description is avoided, but like parts are designated by like numerals having a distinguishing sign. The article shown in the respective sets of clamping jaws represents a drill D with a shank d welded thereon. However, the size and length or shape of the parts to be welded may require a different setting of table 5 in respect to slide 6 than as shown, and for this reason table 5 is adjustable longitudinally on shafts 4, and slide 6 is also adapted to be shifted to work within fixed limits at different points on said shafts. Thus, slide 6 has tubular portions 33 and 34 at its bottom through which shafts 4 extend, portion 34 being split and provided with clamping bolts 35 to either take up wear or to fasten slide 6 fixedly on the shafts for reasons hereinafter described. The main function of slide 6 is to carry one of the parts—drill D—into welding engagement with the other part—shank d, and the requisite pressure to effect a homogenous weld is applied by a toggle-link 36 pivotally engaged with slide 6 approximately in line with the article being welded and by a lever 37 having a head 38 rotatably mounted on a vertical pin 39 on cross-bar 7. This pin is not alone relied upon to take the thrust of pressure-applying operations, as head 38 is partly circular and fitted snugly within a corresponding circular seat 40 formed in a backing projection integral with cross-bar 7. A laterally inclined extension 41 has a set screw 42 to provide an adjustable stop for lever 37 in its retiring movement. The limit of forward movement of slide 6 is fixed by the play of toggle-link 36 in the flaring sockets 43 and 44 which confine the round-headed ends of the link in slide 6 and lever-head 38, respectively. Cross-bar 7 is also sleeved to slide on parallel shafts 4, but has split bearing ends 45 with clamping bolts 46 to fasten the cross-bar in any desired position. In this way, both slide 6 and the cross-bar 7 may be jointly shifted to different positions on shafts 4 without altering the length of throw of the slide, or the said slide and cross-bar may be set in close working relations to shorten the throw of lever 37 and the thrust movement of slide 6. Fixing the cross-bar 7 on shafts 4 permits operation of slide 6 by lever 37, and obviously, if slide 6 is clamped on shaft 4 by bolts 35, and cross-bar 7 is released to slide on shafts 4, the lever 37 will be found useful in shifting the cross-bar into different positions if the occasion arises for a new setting of the parts to accommodate different kinds of work.

Now referring to the modified form of the invention shown in Fig. 7, the essential distinguishing feature therein is embodied in the vertically-movable work-holding clamp 22$^a$ which is also carried back and forth on horizontal lines by slide head 24. A link 50 connects this clamp 22$^a$ with one end of a tilting lever 51 pivoted on guide extension 52 of slide 24 and leg 23, and a counterweight 53 on the opposite end of the lever serves to hold clamp 22$^a$ in raised position, as shown by dotted lines, when slide head 24 is retired and the piece of work d is either introduced into or removed from the semi-circular seats of the clamps. Obviously, the horizontal movement of slide-head 24 may be limited to substantially the depth of a single seat by the arrangement of parts described as it is only necessary to withdraw the piece of work d from clamp 20 until it is free to be raised and then when raised it may be removed from clamp 22$^a$ and with even greater convenience and despatch than if on a lower plane directly opposite clamp 20. When clamp 22$^a$ is raised there is nothing to interfere with the placing of the work therein, and the counterweight 53 balances the parts and the work so as to facilitate changing operations. A preferred form of box 8' is also shown in Fig. 7, which differs from the box 8 of Fig. 6 in that the depending walls 54 are integral with slide member 5 and have a removable connecting plate 55 bolted thereto to confine shaft 4. Then a separate steel bearing plate 56 is also provided to take the wear at the point of rest engagement with shaft 4. A lining 57 of insulating material between plates 55 and 56 and at the inner sides of walls 54 electrically insulate slide 5 from shaft 4.

What we claim is:

1. In a welding machine, guide members, separate work-holding clamps having separate carriers slidably mounted for independent movement on said guide members, means to impart a forced slide movement to one of said carriers, and a slidable mounting for said means on said guide members.

2. In a welding machine, parallel shafts, a table and a slide member and a cross-bar mounted for independent movement and adjustment on said shafts, work-holding clamps on said table and slide member, and means on said cross-bar to reciprocate said slide member.

3. In a welding machine, parallel guide members, a table having longitudinal adjustment on said members and insulated therefrom, means to fasten said table in adjusted positions, a slide member adjacent to said table movably mounted on said guide members, work-holding clamps on said table and slide member respectively, an adjustable cross-bar on said guide members having means to fix it in set positions, and means on said cross-bar to reciprocate said slide member.

4. In a welding machine, parallel shafts, a table and means to adjustably fix it in various positions on said shafts, a slide member on said shafts adjacent to said table, a cross-bar, and means to adjustably fix said cross-bar on said shafts adjacent to said slide member, in combination with work-holding clamps and means to open and close the same mounted on said table and slide member, and toggle and lever devices mounted on said cross-bar and connected with said slide member for pressure-applying purposes.

5. In a welding machine, a set of parallel guide members, a table on said guide members having means to adjustably fix it in different longitudinal, vertical and transverse positions, a slide member, work-holding clamps having adjustable means to open and close the same, and means adjustably supported adjacent to said slide member to reciprocate the same in welding operations.

6. In a welding machine, parallel shafts, work-holding jaws, a table for said jaws loosely engaged with one of said shafts, a clamping sleeve longitudinally adjustable on the other shaft, and bolts engaged with said table and sleeve to adjustably fix the table in different set positions.

7. In a welding machine, parallel shafts, a table having a box loosely engaged with one of said shafts, a work-holding clamp having operating means mounted on said table, a sleeve adjustably mounted on one of said shafts and electrically insulated therefrom, and separate sets of bolts engaged with said sleeve to vary the elevation of said table and to adjust the same transversely.

8. In a welding machine, parallel shafts, a table having a fixed jaw for the work and a slidable jaw adjacent thereto, and adjustable means to operate said slidable jaw, said jaws being arranged intermediate said shafts and having electrical connections depending therefrom.

9. In a welding machine, parallel shafts, a table having means to variably position the same in fixed relation on said shaft, a pair of work-holding jaws having terminal legs extending downwardly between said shafts, and one of said jaws being slidably mounted and having a rotatable bell-crank and link connection provided with a rotatable eccentric support on said table.

10. In a welding machine, parallel shafts, a work-holding clamp and a table therefor having a box loosely engaged with one shaft and a split clamping sleeve on the other shaft and provided with bolts to adjustably fix said table in different positions, a slidable member on said shafts having a work-holding clamp and a split clamping sleeve, and means to reciprocate said member having a support adjustably mounted on said shafts.

11. In a welding machine, parallel shafts and work-holding clamps having separate supports adjustably mounted on said shafts, and means to reciprocate one of said supports having an independent support longitudinally adjustable on said shafts.

12. In a welding machine, parallel shafts and a slide member thereon having a work-holding clamp, a cross-bar adjustably secured on said shafts having a recessed backing portion, and a rotatable lever seated within said backing portion and provided with a toggle connection for said slide member.

13. In a welding machine, parallel shafts, a work-holding clamp and a supporting member therefor slidably mounted on said shafts and having an open socket for a toggle-link, in combination with a cross-bar having a rotatable lever thereon provided with an open socket, and a toggle-link engaged at its ends within said sockets, said cross-bar having split clamping portions sleeved upon said shafts and bolts to clamp the same.

14. In a welding machine, parallel shafts, a work-holding clamp and a support therefor slidably mounted on said shafts, a cross-bar mounted for independent adjustment on said shafts, a lever having a rounded head, a backing projection on said cross-bar having a circular recess to seat said head, a set-screw stop for said lever, and a toggle-link connecting said lever and slidable support.

15. In a welding machine, a shaft, a split sleeve thereon having clamping bolts, a table having a depending flange at the side of said sleeve, and bolts vertically and horizontally arranged through the top of said table and said flange and engaged with said sleeve to adjustably fix the table at different elevations and in different positions transversely.

16. In a welding machine, a table having a work-holding jaw fixed thereon, a slide having a work-holding jaw, a link connected with said slide, a bell-crank lever for said link, a lever having a rotatable stem provided with an eccentric pin for said bell-crank lever to rotate upon, and a split bearing and clamping bolts on said table for said rotatable stem.

17. In a welding machine, a plurality of parallel shafts, and a set of work-holding clamps and means to open and close the same having a supporting table adjustably mounted on said shafts, said table having a box at its bottom and a removable bearing plate insulated therefrom for one of said shafts.

18. In a welding machine, a set of work-holding jaws, one of which is mounted to move to and fro in respect to the other jaw in two different angularly-related planes to facilitate introduction and removal of the work.

19. In a welding machine, a set of work-holding jaws, means to support said jaws for separable movement in the same plane, combined with means to support said jaws for further separable movement in a plane at an angle to the first plane.

20. In a welding machine, a set of work-holding jaws, and means to move one of said jaws horizontally having a balancing device to move said jaws vertically.

21. In a welding machine, a fixed work-holding jaw and a slidable member having a second work-holding jaw slidably mounted therein, and separate means to slide said member and second jaw independently in different directions.

22. In a welding machine, a fixed work-holding jaw having a terminal connection, a slide head and a second work-holding jaw slidably mounted thereon having a terminal connection, and a counterweighted lever to shift said second jaw to different elevations.

In testimony whereof we affix our signatures in presence of two witnesses.

WILLIAM C. WINFIELD.
ALBERTIS C. TAYLOR.

Witnesses:
A. ELVOUDERS,
HELEN BEACH.